July 7, 1925.
E. B. ALLEN
CLUTCH DEVICE
Original Filed July 23, 1921
1,544,714
3 Sheets-Sheet 2
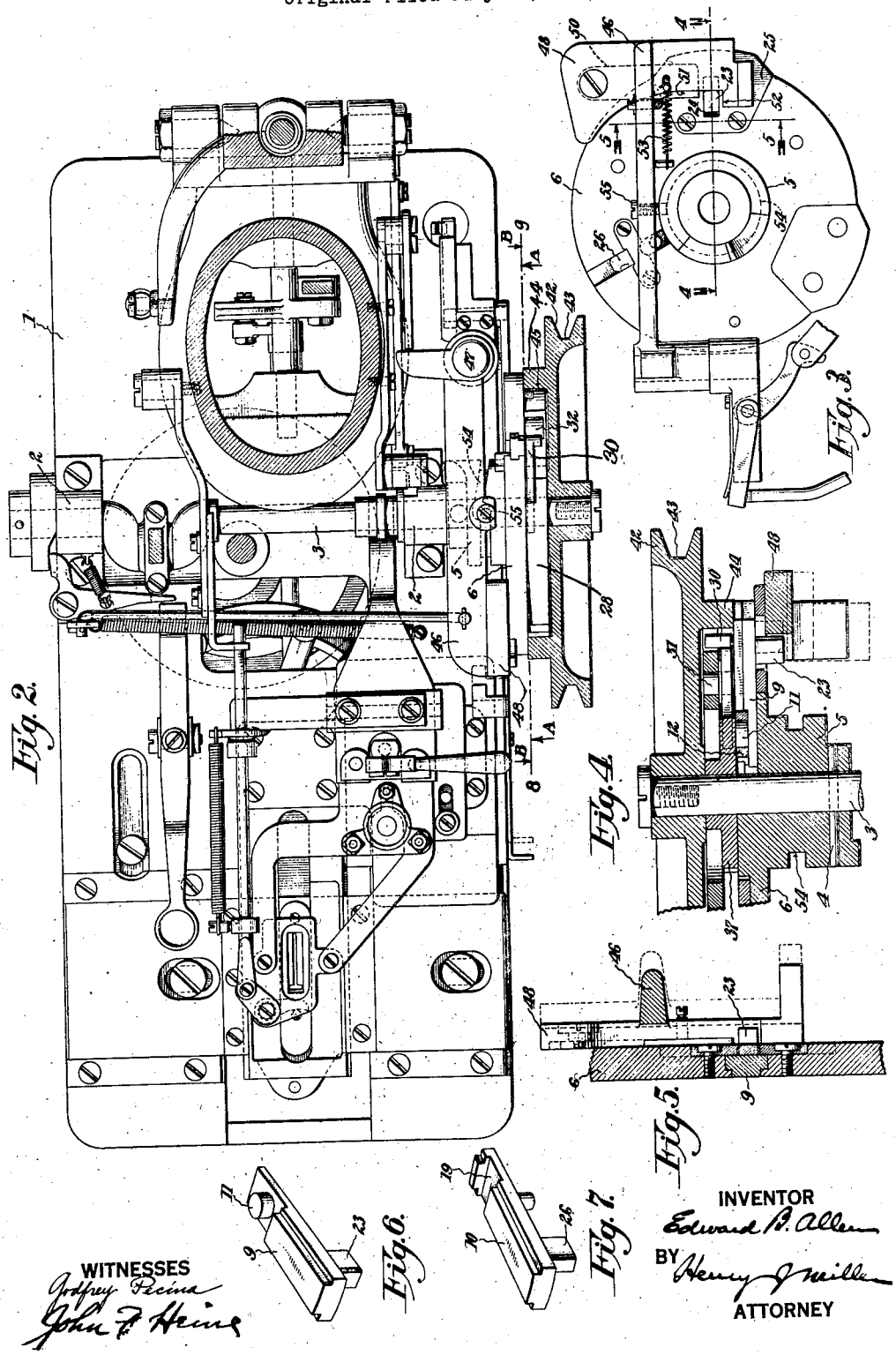
INVENTOR
Edward B. Allen
BY
ATTORNEY
WITNESSES July 7, 1925.
E. B. ALLEN
1,544,714
CLUTCH DEVICE
Original Filed July 23, 1921   3 Sheets-Sheet 3
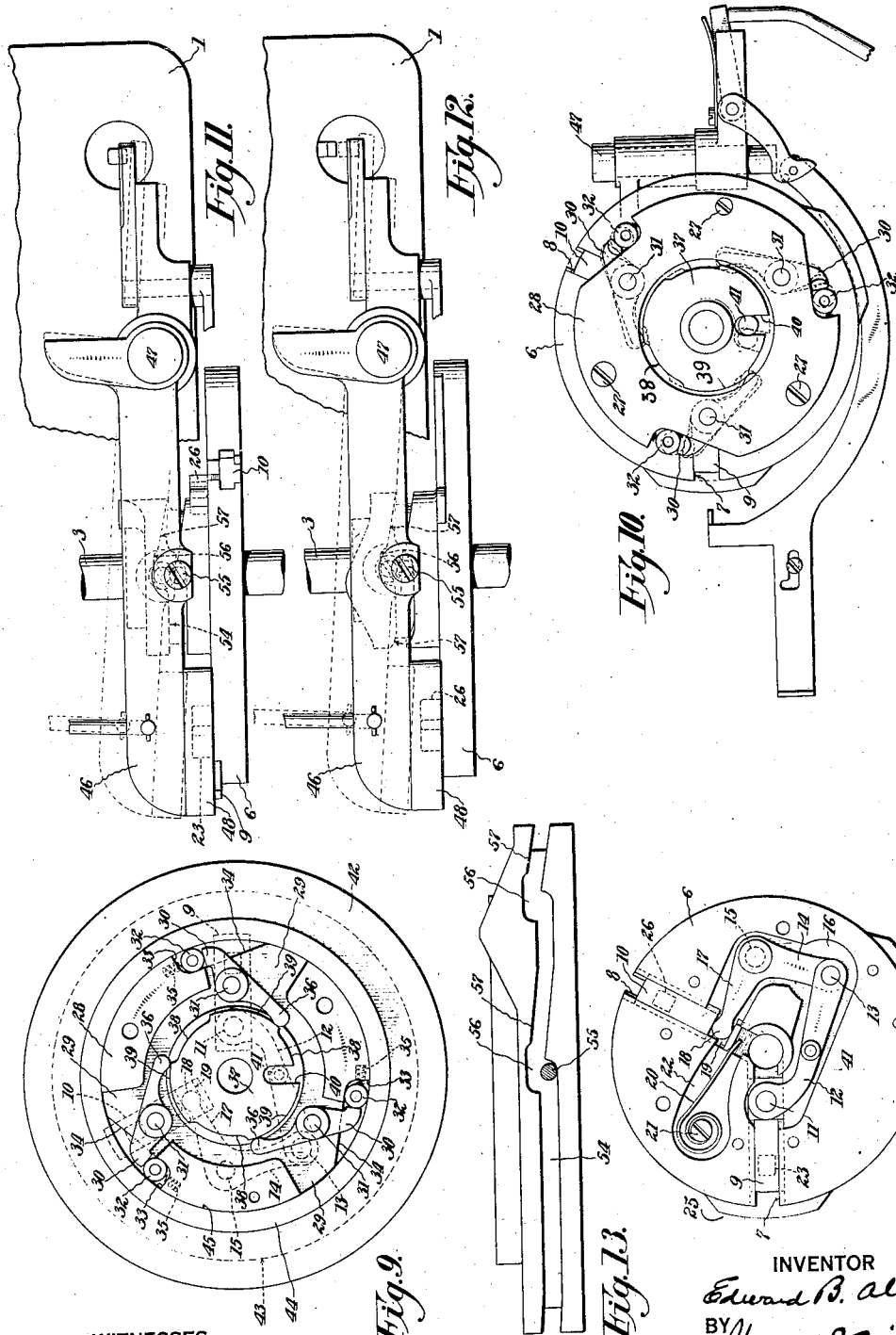
INVENTOR
Edward B. Allen
BY
ATTORNEY
WITNESSES Patented July 7, 1925.

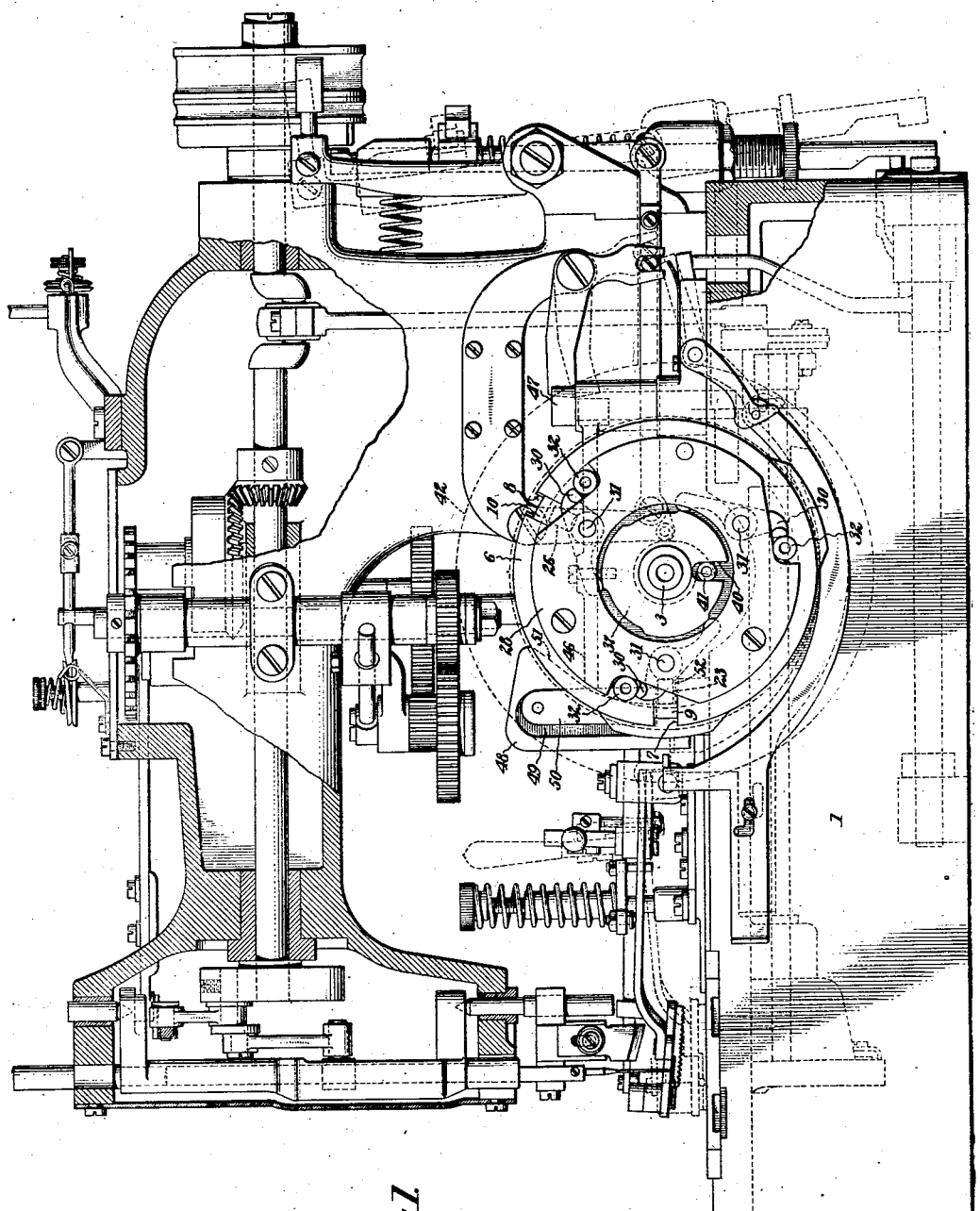

1,544,714

UNITED STATES PATENT OFFICE.

EDWARD B. ALLEN, OF NEWTOWN, CONNECTICUT, ASSIGNOR TO THE SINGER MANUFACTURING COMPANY, OF ELIZABETH, NEW JERSEY, A CORPORATION OF NEW JERSEY.

CLUTCH DEVICE.

Original application filed July 23, 1921, Serial No. 487,001. Divided and this application filed February 27, 1923. Serial No. 621,553.

*To all whom it may concern:*

Be it known that I, EDWARD B. ALLEN, a citizen of the United States, residing at Newtown, in the county of Fairfield and State of Connecticut, have invented certain new and useful Improvements in Clutch Devices, of which the following is a specification, reference being had therein to the accompanying drawings.

This invention relates to clutch devices for transmitting rotary motion from a driving element to a driven element and has for an object to provide a clutch which, when actuated, will couple the driven element to the driving element for continuous motion for a fractional part of one revolution only and will thereupon automatically uncouple the driven element from the driving element and stop the driven element at a predetermined point.

A clutch of this type has been found useful in automatic buttonhole sewing machines such as disclosed in my copending application Serial No. 487,001, filed July 23, 1921, of which this application is a division. As disclosed in my said copending application, the rotary driven element of the clutch is adapted to control certain operations of the machine prior and subsequent to the sewing operation. When the machine is started, the clutch is tripped into action and the rotary driven element is thereby caused to make a partial rotation during which it acts through suitable connections to perform the desired operations preparatory to sewing, such as the closing of the work-clamp and the tripping of the stop-motion device to start the stitch-forming mechanism. After the buttonhole is stitched the stop-motion in acting to stop the stitch-forming mechanism, again trips the clutch into action and the rotary driven element or shaft is caused to make a second partial rotation during which it automatically performs the desired operations subsequent to sewing, such as the cutting of the buttonhole, the cutting of the sewing threads, the opening of the work-clamp to release the work, etc.

The clutch mechanism is interposed between a continuously running driving element and a rotary driven element and preferably comprises one or more clutch elements which are controlled by a plurality of clutch-operating dogs mounted upon and movable radially of the driven element in angularly spaced relation and interconnected so as to partake simultaneously of inward or outward radial movements. These dogs are adapted to cooperate successively with a clutch-controlling lever mounted on the frame of the machine; the release of one dog by the clutch-controlling lever effecting the coupling of the driving and driven elements and the engagement of the next dog with the clutch-controlling lever after a partial rotation effecting the uncoupling of said elements.

In the accompanying drawings, Fig. 1 is a right side elevation, partly in section, of a machine embodying the invention. Fig. 2 is a horizontal section, through the bracket-arm of the machine, at a level above the bed and showing the latter in plan. Fig. 3 is a detail view showing the inner face of the driven clutch-disk and clutch-controlling lever for the auxiliary or control shaft. Fig. 4 is a section on the line 4—4, Fig. 3. Fig. 5 is a section on the line 5—5, Fig. 3. Figs. 6 and 7 are, respectively, detail perspective views of the two clutch-controlling slide-blocks carried by the driven clutch-disk. Figs. 8 and 9 are detail views of the clutch mechanism for the auxiliary or control shaft, Fig. 8 being taken on line 8—9 of Fig. 2 looking in the direction of arrows A, while Fig. 9 is taken on the same line but looking in the direction of arrows B. Fig 10 is a view illustrating the movement of the clutch-rolls and their operating levers under the influence of the central cam. Figs. 11 and 12 are detail views, in plan, of the clutch-controlling lever showing its movement from full-line or stopping position to dotted line or running position, and Fig. 13 is a development of the clutch-lever controlling cam.

In the embodiment of the invention chosen for the purposes of the present disclosure 1 represents a sewing machine bed on which is mounted pillow blocks 2 constituting bearing supports for a rotary driven element or shaft 3. Pinned to the shaft 3 at 4, Fig. 4 is the cylindrical hub 5 of the driven clutch disk 6 which is formed with a pair of radial slideways 7, 8, Fig. 8, spaced angularly about 120° and adapted to receive clutch-operating elements or slide-blocks 9 and 10, respectively. The inner end of the slide-block 9, Figs. 6 and 8 is reduced in thickness and formed with a cylindrical stud 11 which enters an aperture in one end of a link 12 the opposite apertured end of which embraces a similar stud 13 at the free end of one arm 14 of a bell crank-lever fulcrumed at 15 within a recess 16 in the outer face of the driven disk 6. The other arm 17 of the bell crank-lever is formed with a circular extremity 18 which is received in the transverse slot 19 in the inner end of the slide-block 10. The slide-blocks 9 and 10 are thus interconnected so that they will move simultaneously either inwardly or outwardly. A spring 20 secured by a screw 21 within a recess 22 in the outer face of the disk 6 bears against the inner end of the slide-block 10 and tends to force the latter and its companion block 9 outwardly. The slide-block 9 is formed with a lateral lug 23 which extends through the slot 24, Fig. 3, in a plate 25 let into the inner face of the disk 6. The outer end of this slot limits the radial movement of the slide-blocks under the influence of the spring 20. The slide-block 10 is formed with a lateral lug 26 similar to the lug 23. The lugs 23, 26 extend inwardly beyond the plane of the inner face of the driven clutch disk and are adapted to coact successively with a clutch controlling lever to be described.

Mounted on the outer face of the driven clutch disk 6 i. e., the face shown in Figs. 1 and 10, by screws 27, is the ring 28. The inner face of the ring 28, or the face shown in Fig. 9 is in contact relation with the outer face of the disc 6, and is recessed at 29 to receive the three clutch-roll operating levers 30 which are fulcrumed on the pins 31 carried by the ring 28. The ring 28 is peripherally notched to receive the clutch-rolls 32, and to provide the end walls 33, Fig. 9, and the inclined walls 34 along which the clutch rolls are urged by the coil springs 35 housed in suitable apertures in the end-walls 33 of the clutch roll notches. The levers 30 which serve to force the clutch rolls 32 down the inclined walls 34 and toward the end walls 33 are formed with tail pieces 36 which are acted upon by the cam-disk 37 mounted to turn upon and relatively to the auxiliary shaft 3. The cam-disk 37 is formed with peripheral depressions 38 and elevations 39 against which the tail pieces 36 of the levers 30 rest. The cam-disk 37 is also slotted radially at 40 to receive the roll 41 carried by the link 12.

Mounted to rotate constantly on the outer end of the auxiliary shaft 3 is the driving pulley 42 formed with the belt groove 43 and an inwardly extending flange 44 which fits over the ring 28 and affords a cylindrical inner clutch wall 45. When either of the slide-blocks 9, 10 is forced inwardly against the pressure of the spring 20, the cam disk 37 is turned clockwise, Fig. 9 by the roll 41 on the link 12 and the cam elevations 39 operate upon the levers 30 to cause them to force the clutch rolls 32 toward the end walls 33 and out of wedging engagement with the cylindrical driving wall 45 and the inclined driven walls 34. When the slide-blocks are permitted to move outwardly under the influence of the spring 20, the cam disk 37 is rotated counter-clockwise, Fig. 9, and the clutch rolls 32 are permitted to move under the influence of the springs 35 into wedging engagement with the circular driving wall 45 and inclined driven walls 34.

The radial movements of the slide-blocks 9, 10 to clutch and declutch the driving and driven wheels 42 and 6, respectively, are controlled by the clutch-controlling lever 46 of a form common in this art and shown, for example, in my Patent No. 1,048,786, of December 31, 1912. This lever is fulcrumed on the vertical pin 47 rising from the bed 1 and is formed at its forward end with a plate-like head 48 having in its face adjacent the driven disk 6 a recess 49, Fig. 1, in which is pivoted the usual latch-plate 50. The head 48 is also formed with the usual cam-edge 51 at the lower end of which is the stop-shoulder 52. When the clutch-controlling lever 46 is in the position shown in Figs. 1 and 3, the slide-block 9 and its companion 10 are held in their inner or declutching positions by the lower end of the cam-edge 51 which is engaged by the lug 23. When the lever 46 is shifted away from the disk 6, as indicated in dotted lines in Fig. 12, the slide-blocks are released and permitted to move outwardly to clutch the auxiliary shaft 3 to the constantly rotating pulley 42. When the lever 46 is shifted toward the disk 6, the cam-edge 51 is carried into the path of circular movement of the lugs 9, 10 on the slide-blocks and when engaged by one of these lugs will force such lug inwardly and declutch the driving and driven disks. When such lug strikes the shoulder 52, the auxiliary shaft 3 will be stopped and a rebound of such shaft will be prevented by the movement of the lower end of the latch 50, into position over said lug under the influence of the spring 53, Fig. 3. The slide-blocks 9, 10, including the lugs 22, 23 thus constitute operating dogs for the cam member 37, which dogs are angularly spaced about the driven wheel 6.

The hub 5 of the driven disk 6 is formed with a cam-groove 54 which is entered by a pin 55 depending from the clutch-controlling lever 46. This cam-slot is formed at its two stopping positions relative to the pin 55, with offsets 56, see Fig. 13, which permit the lever 46 to be shifted away from the disk 6 in a direction axially of the shaft 3 to release the engaged one of the slide blocks or dogs and start the auxiliary shaft 3. Immediately after one of the slide-blocks has been released and the auxiliary shaft started, one of the inclined portions 57 of the cam-groove 54 engages the pin 55 and returns the head 48 of the clutch-controlling lever to stopping position before the other silde-block has reached the declutching cam-edge 51. The shaft 3 will therefore invariably be stopped after executing a partial rotation; the first partial rotation being, in the embodiment of the invention illustrated, about 120° and the other about 240°.

Having thus set forth the nature of the invention, what I claim herein is:—

1. In a clutch device, the combination with a continuously running driving element, of a driven element, a clutch connection between said elements, a plurality of interconnected and radially movable clutch-operating elements mounted on said driven element in angularly spaced relation, and a clutch-controlling element mounted independently of said driving and driven elements in position for coaction with said clutch-operating elements, successively.

2. In a clutch device, the combination with a continuously running driving element, of a driven element, a clutch connection between said elements, clutch-operating means comprising a plurality of interconnected clutch-operating elements mounted on said driven element in angularly spaced relation and movable toward and away from the axis of said driven element, and a clutch-controlling cam and stop element mounted independently of said driving and driven elements for successive coaction with said clutch-operating elements.

3. In a clutch device, the combination with a continuously running driving element, of a driven element, a clutch connection between said elements, clutch operating means comprising a plurality of clutch-operating elements mounted on said driven element in angularly spaced relation and interconnected for simultaneous clutching or declutching movements, spring means constantly urging said clutch-operating elements to clutching position, and a declutching element mounted independently of said driving and driven elements and having a declutching cam and a positive stop shoulder adapted to coact with said interconnected clutch-operating elements, successively.

4. In a clutch device, a driving wheel, a driven wheel, a plurality of clutch-rolls between said wheels, a plurality of clutch-roll operating levers mounted on the driven wheel, a lever operating cam, a plurality of cam operating dogs spaced angularly about said driven wheel and connected to said cam, and a clutch-controlling lever adapted to coact with said dogs, successively.

5. In a clutch device, a driving wheel, a driven wheel, a clutch element between said wheels, a plurality of clutch element operating blocks mounted to slide radially in different directions on the driven wheel, means including a link and bell crank connection for causing said blocks to move simultaneously either inwardly or outwardly, an operative connection between said means and said clutch element, and a clutch-controlling lever adapted to coact with said blocks, successively.

In testimony whereof, I have signed my name to this specification.

EDWARD B. ALLEN.